United States Patent
Lin et al.

(10) Patent No.: US 12,408,251 B2
(45) Date of Patent: Sep. 2, 2025

(54) KEYBOARD BACKLIGHT CONTROL

(71) Applicant: DELL PRODUCTS L.P., Round Rock, TX (US)

(72) Inventors: Yong-Teng Lin, Yilan (TW); Chun-Kai Tzeng, KeeLung (TW); Bradford Edward Vier, Taipei (TW)

(73) Assignee: Dell Products L.P., Round Rock, TX (US)

( * ) Notice: Subject to any disclaimer, the term of this patent is extended or adjusted under 35 U.S.C. 154(b) by 178 days.

(21) Appl. No.: 18/361,856

(22) Filed: Jul. 30, 2023

(65) Prior Publication Data

US 2025/0040015 A1    Jan. 30, 2025

(51) Int. Cl.

| | |
|---|---|
| *G09G 5/00* | (2006.01) |
| *G06F 3/02* | (2006.01) |
| *H04R 1/02* | (2006.01) |
| *H05B 47/115* | (2020.01) |
| *H05B 47/16* | (2020.01) |

(52) U.S. Cl.
CPC ......... *H05B 47/115* (2020.01); *G06F 3/0202* (2013.01); *H04R 1/028* (2013.01); *H05B 47/16* (2020.01); *H04R 2499/15* (2013.01)

(58) Field of Classification Search
None
See application file for complete search history.

(56) References Cited

U.S. PATENT DOCUMENTS

| | | | |
|---|---|---|---|
| 10,719,137 B1 | 7/2020 | Kamepalli et al. | |
| 2007/0296701 A1* | 12/2007 | Pope | G06F 1/3271 |
| | | | 345/168 |
| 2014/0201666 A1* | 7/2014 | Bedikian | G06F 3/04815 |
| | | | 715/771 |
| 2020/0356182 A1 | 11/2020 | Kamepalli et al. | |
| 2023/0293093 A1* | 9/2023 | Niijima | A61B 5/7405 |

* cited by examiner

*Primary Examiner* — Carl Adams
(74) *Attorney, Agent, or Firm* — Larson Newman, LLP

(57) ABSTRACT

An information handling system includes keyboard backlights, an embedded controller, and a processor. The embedded controller communicates with the keyboard backlights. In response to an activate keyboard backlights signal, the embedded controller turns on the keyboard backlights. In response to a deactivate keyboard backlights signal, the embedded controller turns off the keyboard backlights. The processor communicates with the embedded controller. The processor determines whether an ultrasonic waveform is received. In response to the ultrasonic waveform being received, the processors provide the deactivate keyboard backlights signal to the embedded controller. In response to the ultrasonic waveform not being received, the processor provides the activate keyboard backlights signal to the embedded controller.

20 Claims, 4 Drawing Sheets

KEYBOARD BACKLIGHT CONTROL

FIELD OF THE DISCLOSURE

The present disclosure generally relates to information handling systems, and more particularly relates to the control of a keyboard backlight.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus, information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

An information handling system includes keyboard backlights, an embedded controller, and a processor. The embedded controller may communicate with the keyboard backlights. In response to an activate keyboard backlights signal, the embedded controller may turn on the keyboard backlights. In response to a deactivate keyboard backlights signal, the embedded controller may turn off the keyboard backlights. The processor may communicate with the embedded controller. The processor may determine whether an ultrasonic waveform is received. In response to the ultrasonic waveform being received, the processor may provide the deactivate keyboard backlights signal to the embedded controller. In response to the ultrasonic waveform not being received, the processor may provide the activate keyboard backlights signal to the embedded controller.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Figure 1:
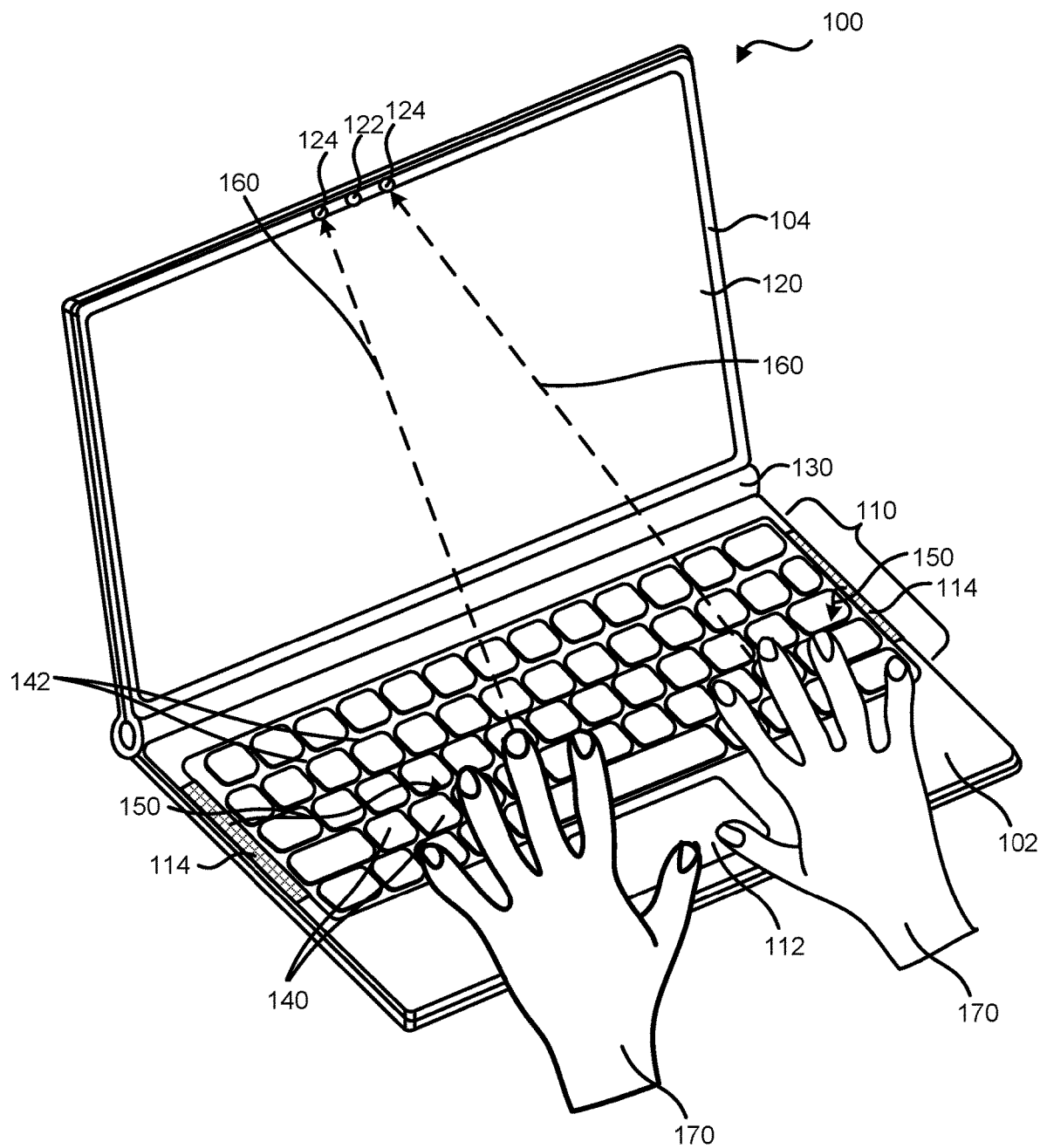
FIG. 1 is a diagram of an information handling system according to at least one embodiment of the present disclosure.

FIG. 1 an information handling system 100 according to at least one embodiment of the present disclosure. For purposes of this disclosure, an information handling system can include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (such as a desktop or laptop), tablet computer, mobile device (such as a personal digital assistant (PDA) or smart phone), server (such as a blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Information handling system 100 includes a base portion 102 and a top 104. Base portion 102 includes a keyboard 110, a touchpad 112, and speakers 114. Top portion 104 includes a display device 120, a camera 122, and microphones 124. In an example, touchpad 112 may be any suitable pointing device. Base portion 102 is connected top portion 104 via a mechanism 130, such as one or more hinges. Keyboard 110 includes multiple keys 140 and keyboard backlights 142. In an example, keyboard backlights 142 may be utilized to illuminate the keys 140. When the information handling system 100 comprises a 2-in-1 device, mechanism 130 may enable the top portion 104 to be connected to bottom portion 102 for use as a laptop device and may enable the top portion 104 to be detached from bottom portion 102 to enable the top portion 104 to be used as a tablet information handling system. Display device 120 may include one or more light emitting devices, such as, for example, light emitting diodes (LEDs), organic LED (OLED), liquid crystal display (LCD), another type of light emitting device, or any combination thereof.

While information handling system 100 is illustrated in FIG. 1 with two speakers 114 and two microphones 124, the information handling system may include any number of speakers and microphones without varying from the scope of this disclosure. The locations of speakers 114 and microphones 124 are merely exemplary and the speakers and microphones may be located at different locations without varying from the scope of this disclosure. Information handling system 100 may include additional components without varying from the scope of this disclosure.

In an example, information handling system 100 may utilize camera 122 for human presence detection. In previous information handling systems, the coverage of features mainly focus on human presence, intelligent privacy, power optimization, or the like. These previous information handling systems fail to determine keyboard backlight control. Information handling system 100 may be improved by speakers 114 and microphones 124 determining whether an individual's hands 170 are located over keyboard 110. Based on this determination, a processor or embedded controller may turn on keyboard backlights 142.

In certain examples, a basic input/output system (BIOS) of information handling system 100 may execute an ultrasonic management application to control an ultrasonic waveform, as illustrated by arrows 150, to be provided from speakers 114 and detect the ultrasonic waveform at microphones 124, as illustrated by arrows 160. In an example, while the ultrasonic waveform is detected at microphones 124, BIOS may continue to monitor the microphones to determine whether a change has occurred. In response to detecting an interruption of the ultrasonic waveform at microphones 124, the BIOS may provide a backlight on request to a processor, such as an embedded controller. In an example, the communication between the BIOS and the processor may be via any suitable interface protocol, such as a windows management instrumentation (WMI) communication protocol. In response to the backlight on request, the processor may activate the keyboard backlights 142 and provide a backlight on response to the BIOS.

The BIOS may continue to monitor microphones 124 to determine whether the microphones are still not receiving the ultrasonic sonic waveforms. In response to BIOS detecting that microphones 124 are not receiving the ultrasonic waveform from speakers 114, BIOS may set a timer. In an example, the timer may be a particular amount of continuous time that the ultrasonic waveform is not detected before backlights 142 are tuned off. In response to the timer expiring, BIOS may provide a backlight off request to the processor, such as an embedded controller. Based on the backlight off request, the processor may deactivate keyboard backlights 142 and provide a backlight off response to the BIOS. Additional operations performed by components of information handling system 100 to detect whether hands 170 are located over keyboard 100 and control the keyboard backlights 142 will be described with respect to FIG. 2 below.

Figure 2:
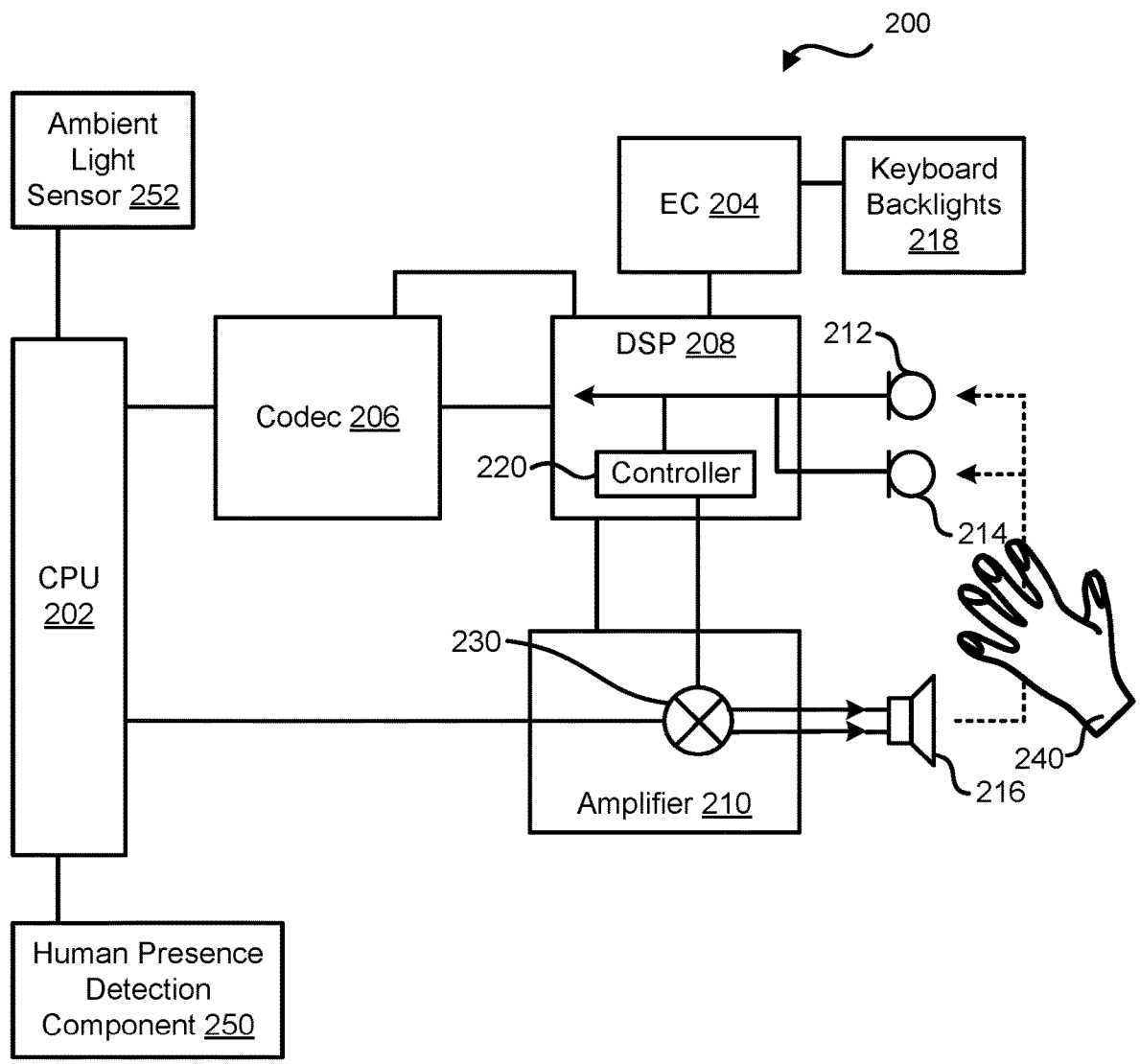
FIG. 2 is a block diagram of a control system for a keyboard backlight according to at least one embodiment of the present disclosure.

FIG. 2 illustrates a control system 200 according to at least one embodiment of the present disclosure. Control system 200 includes a central processing unit (CPU) 202, an embedded controller 204, a codec 206, a digital signal processor (DSP) 208, an amplifier 210, microphones 212 and 214, a speaker 213, and keyboard backlights 218. Speaker 216 may be substantially similar to speakers 114 of FIG. 1, microphones 212 and 214 may be substantially similar to microphones 124 of FIG. 1, and keyboard backlights 218 may be substantially similar to microphones 142 of FIG. 1. In an example, the components of control system 200 may be utilized to turn keyboard backlights 142 of FIG. 1 on or off based on whether one or more hands 170 of FIG. 1 are located over keyboard 110. DSP 208 includes a controller circuit 220, and amplifier 210 includes a mixer 230. Control system 200 may include additional components without varying from the scope of this disclosure.

During operation of control system 200 within an information handling system, such as information handling system 100 of FIG. 1, DSP 208 may generate an ultrasonic waveform. The ultrasonic waveform may be utilized to determine whether an individual's hand 240 is placed over the keyboard, such as keyboard 110 of FIG. 1. In certain examples, control system 200 may be tested and calibrated to determine a power level for ultrasonic waveform from speaker 216 such that microphones 212 and 214 may properly receive the waveform from the speaker. After the power level for the ultrasonic waveform has been calibrated, an individual may set a sensitivity level within DSP 208 or CPU 202 to determine whether hands are located over the keyboard. In an example, the individual may set the sensitivity level to detect only when hands 240 are located directly over the keyboard or within a predetermined distance from the keyboard, such as 5 inches, 6 inches, or the like. In certain examples, an individual may change or switch the sensitivity level between hands 240 being directly over the keyboard or within a predetermined distance from the keyboard. In an example, the individual may utilize a graphical user interface (GUI) to select the sensitivity level. The sensitivity level may be a setting within DSP 208 or CPU 202 to correlate a particular power level of the received ultrasonic waveform to a detection of hands 240.

In an example, controller 220 of DSP 208 may provide the generated ultrasonic waveform to mixer 230 of amplifier 210. Based on a signal from CPU 202 and the ultrasonic waveform, amplifier 210 may provide the waveform to speaker 216, which in turn may transmit the ultrasonic waveform toward microphones 212 and 214. In an example, the signal from CPU 202 may be a signal to indicate/control whether amplifier 210 provides the ultrasonic waveform to speaker 216. For example, if CPU 202 provides an enable ultrasonic signal, the enable ultrasonic signal may control amplifier 210 to output the ultrasonic waveform. If CPU 202 provides a disable ultrasonic signal, the disable ultrasonic signal may control amplifier 210 not to output the ultrasonic waveform. In an example, the enable ultrasonic signal may cause mixer 230 to provide the ultrasonic waveform to an output terminal of amplifier 210, and the disable ultrasonic signal may prevent the mixer from providing the ultrasonic waveform to the output terminal of the amplifier.

In certain examples, CPU 202 may perform one or more suitable operations to determine whether to provide the enable ultrasonic signal or the disable ultrasonic signal. For example, CPU 202 may determine whether any suitable prerequisite detection, if any, has been made. In an example, the prerequisite detection may include, but is not limited to, a human presence detection and a human presence detection with a particular ambient light level. If the prerequisite detection is human presence detection, CPU 202 may provide the disable ultrasonic signal to mixer 230 until a presence detection signal is received from human presence detection component 250. In this situation, when human presence detection component 250 detects an individual, via camera 122 of FIG. 1, the human presence detection component may provide the presence detection signal to CPU 202. In response to the presence detection signal, CPU 202 may provide the enable ultrasonic signal to mixer 230, which in turn may provide the ultrasonic waveform to speaker 216 via the output terminal of amplifier 210.

In an example, if the prerequisite detection is both human presence detection and a particular ambient light condition, CPU 202 may provide the disable ultrasonic signal to mixer 230 until both a presence detection signal is received from human presence detection component 250 and an ambient light detection signal is received from an ambient light sensor 252. In this situation, when human presence detection component 250 detects an individual, via camera 122 of FIG. 1, the human presence detection component may provide the presence detection signal to CPU 202. When ambient light sensor 252 detects a particular ambient light level, the ambient light sensor may provide the ambient light detection signal to CPU 202. In an example, the particular ambient light level may be any suitable amount of light, such as a dark place so that keyboard backlights 218 may be visible by the individual associated with the information handling system. In response to both the presence detection signal and the ambient light detection signal, CPU 202 may provide the enable ultrasonic signal to mixer 230, which in turn may provide the ultrasonic waveform to speaker 216 via the output terminal of amplifier 210.

In an example, DSP 208 may be a low power component of information handling system 100 in FIG. 1, such that the DSP may continuously generate the ultrasonic without consuming a large portion of the power stored in a battery of the information handling system. In this situation, CPU 202 may continuously provide the enable ultrasonic signal to mixer 230, which in turn may provide the ultrasonic waveform to speaker 216 via the output terminal of amplifier 210.

In certain examples, speaker 216 and microphones 212 and 214 may be located within information handling system such that the ultrasonic waveform transmitted from the speaker is easily received at the microphones. In an example, the arrangement or alignment of speaker 216 and microphones 212 and 214 may enable CPU 202 to detect hands 240 because the hands may be located within the flight path of the ultrasonic waves. In certain examples, detection of hands 240 may not be affected by ambient light conditions because the ultrasonic waves are not affected by light conditions.

In an example, microphones 212 and 214 may provide the received ultrasonic waveform to DSP 208, which in turn may provide the waveform or a signal representative of the power level of ultrasonic waveform to CPU 202 via codec 206. In certain examples, the power level of the ultrasonic waveform may be provided to CPU 202 via any suitable communication channel or protocol. For example, DSP 208 may provide the signal to codec 206 via a serial peripheral interface (SPI), via a pulse density modulated (PDM) signal to a direct media interface card (DMIC) included with codec 206.

Based on the signal received from DSP 208, CPU 202 may determine whether hands 240 are located over, or substantially near, a keyboard of the information handling system. In an example, if the power level of the ultrasonic waveform received at microphones 212 and 214 is below a threshold level, CPU 202 may determine that hands 240 are blocking all or a substantial portion of the ultrasonic waves, such as the hands being located over the keyboard. In response to the detection of hands 240 based on the power level of the ultrasonic waves, CPU 202 may provide an activate keyboard backlights signal to EC 204. In an example, the activate keyboard backlights signal may be provided via any suitable communication path, such as a general-purpose input/output (GPIO) communication path. In response to the activate keyboard backlights signal, EC 204 may activate or turn on the backlights 218. In an example, EC 204 may continue to illuminate keyboard backlights 218 until the EC receives a deactivate keyboard backlights signal from CPU 202.

After CPU 202 has detected hands 240, the CPU may continue to monitor or determine a power level of the signal from DSP 208. In response to CPU 202 determining that the power level of ultrasonic waveform received at microphones 212 and 214 is above the threshold level, the CPU may start a timer. In an example, CPU 202 may utilize the timer to determine whether hands 240 have been removed from above the keyboard for a particular amount of time, such as 30 seconds, 1 minute, 1 minute and 30 seconds, or the like. Based on the expiration of the timer, CPU 202 may determine that hands 240 have been removed from above the keyboard for the predetermined amount of time and provide a deactivate keyboard backlights signal to EC 204. In response to the deactivate keyboard backlights signal, EC 204 may deactivate or turn off backlights 218. In an example, EC 204 may keep keyboard backlights 218 off until the EC receives the activate keyboard backlights signal from CPU 202. In certain examples, CPU 202 may perform the operations described above with respect to DSP 208 without varying from the scope of this disclosure.

Figure 3:
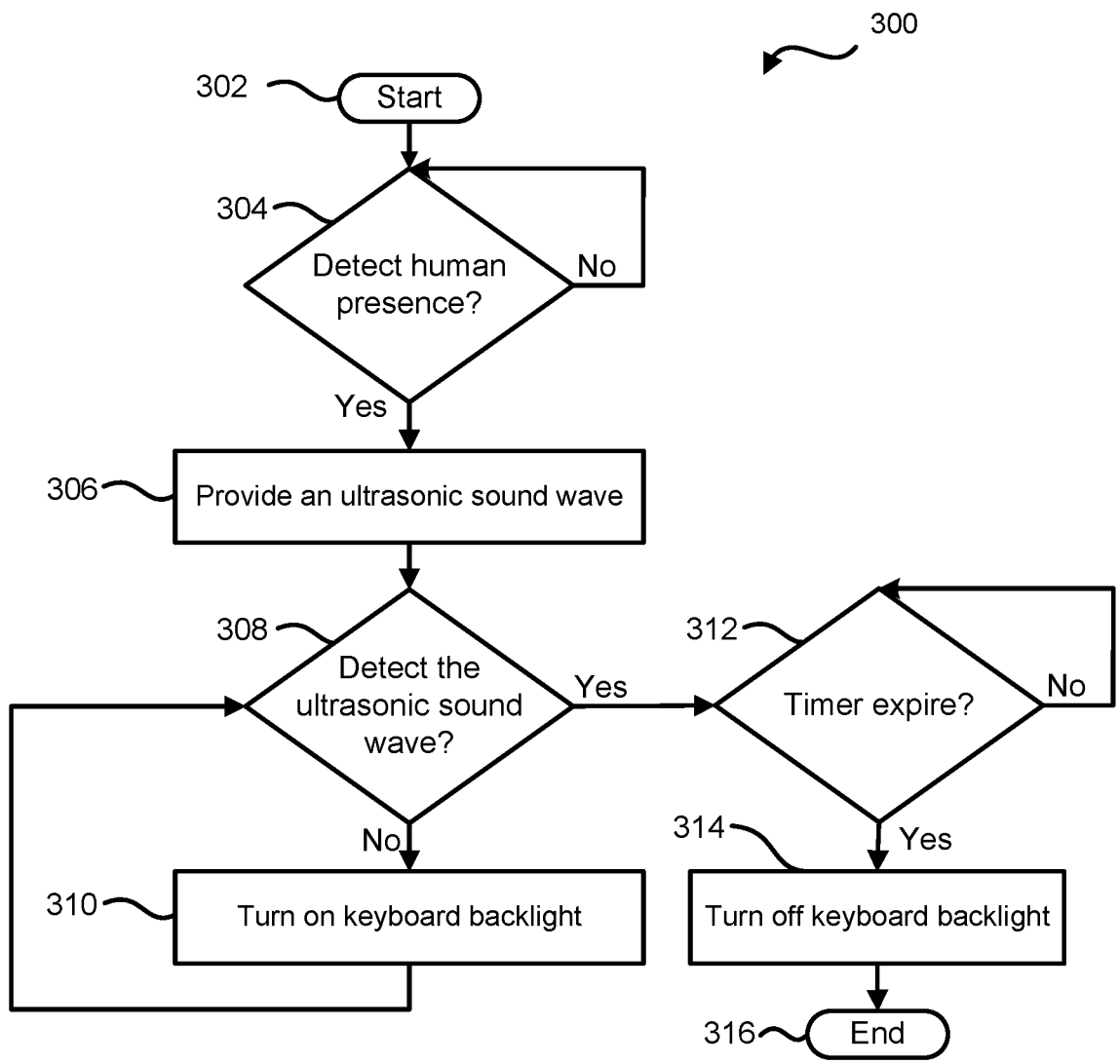
FIG. 3 is a flow diagram of a method for determining whether to turn on a keyboard backlight according to at least one embodiment of the present disclosure.

FIG. 3 shows a method for determining whether to turn on a keyboard backlight according to at least one embodiment of the present disclosure, starting at block 302. In an example, method 300 may be performed by any suitable component including processor 202, EC 204, and DSP 208 of FIG. 2. Not every method step set forth in this flow diagram is always necessary, and that certain steps of the methods may be combined, performed simultaneously, in a different order, or perhaps omitted, without varying from the scope of the disclosure.

At block 304, a determination is made whether a human presence has been detected. In an example, the human presence detection may be performed via any suitable component or processor based on images received from a camera of the information handling system. In an example, the human presence detection may be incorporated with an ambient light detection. In this example, the ambient light detection may determine whether an ambient light around the information handling system is below a threshold level.

In response to the human presence detection, and possibly ambient light level, an ultrasonic sound wave is provided to a speaker at block 306. In an example, the ultrasonic sound wave or waveform may be generated by a DSP of the information handling system and may be provided based on a signal from a CPU or processor. The signal from processor may be based on the human presence detection. In certain examples, the ultrasonic waveform may be provided to the speaker via an amplifier, and the speaker may provide the wave toward one or more microphones of the information handling system.

At block 308, a determination is made whether the ultrasonic sound wave was received at the one or more microphones. In an example, the determination of whether the ultrasonic wave was received at the microphones may be made by a processor. In certain examples, the processor may determine that the ultrasonic wave was received if the power level of the received signal is below a threshold level. The power level may be below the threshold level based on a hand being over a keyboard and blocking the sound wave from reaching the microphones.

In response to the ultrasonic sound wave not being received, keyboard backlights are turned on at block 310 and the flow continues at block 308. In example, an EC may turn on the keyboard backlights based on an activate keyboard backlights signal received from the processor. The activate keyboard backlights signal may be provided to the EC based on the processor determining that the ultrasonic waveform is not being received.

In response to the ultrasonic sound wave being received, a determination is made whether a timer has expired at block 312. In an example, the timer may be set based on the ultrasonic sound wave being received at the microphones after the wave was previously not received. The timer may be set to a particular amount of consecutive time that the hands are no longer over the keyboard before a determination is made that the individual is no longer using the keyboard. In response to the timer expiring, keyboard backlights are turned off at block 314 and the flow ends at block 316. In an example, the EC may turn off the keyboard backlights based on a deactivate backlights signal from the processor.

Figure 4:
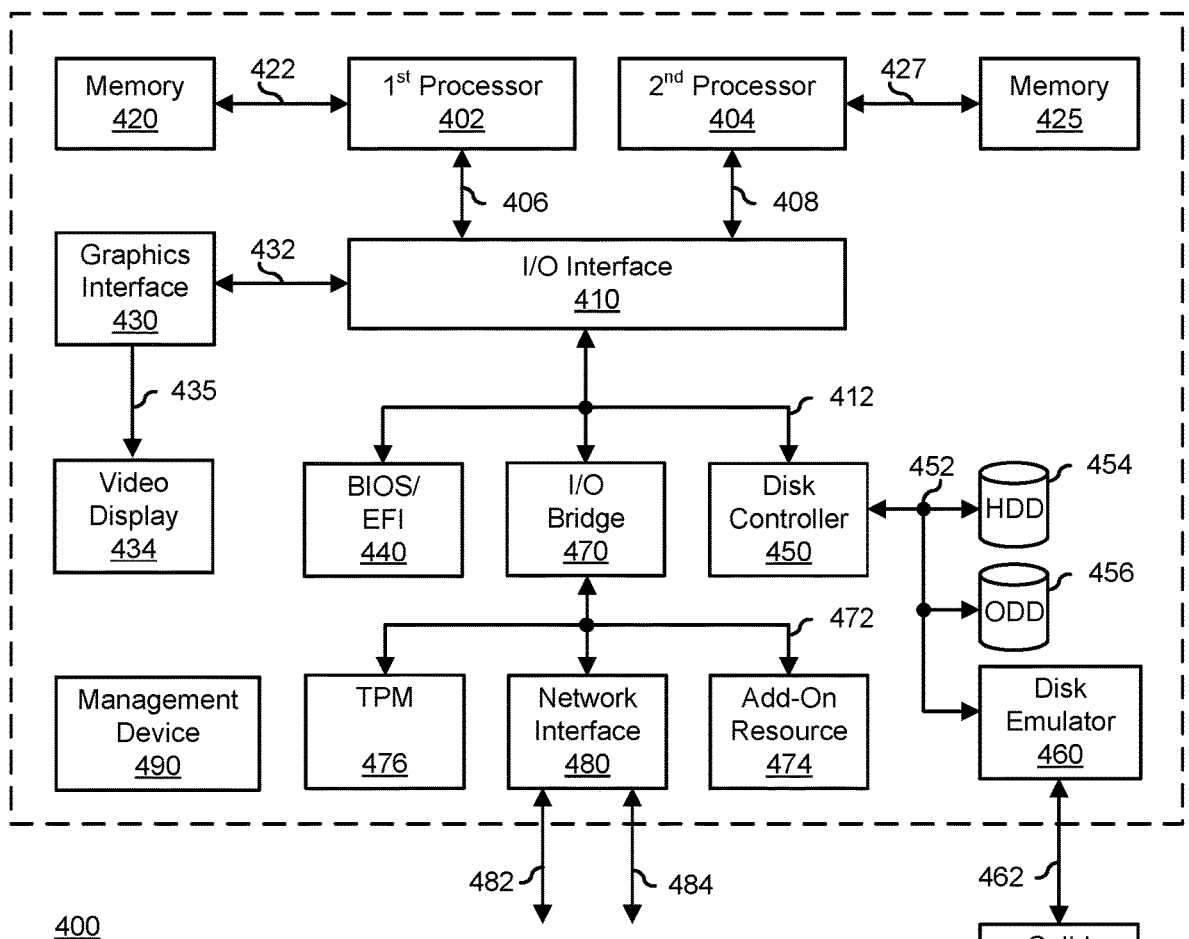
FIG. 4 is a block diagram of a general information handling system according to an embodiment of the present disclosure.

FIG. 4 shows a generalized embodiment of an information handling system 400 according to an embodiment of the present disclosure. For purpose of this disclosure an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 400 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 400 can include processing resources for executing machine-executable code, such as a central processing unit (CPU), a programmable logic array (PLA), an embedded device such as a System-on-a-Chip (SoC), or other control logic hardware. Information handling system 400 can also include one or more computer-readable medium for storing machine-executable code, such as software or data. Additional components of information handling system 400 can include one or more storage devices that can store machine-executable code, one or more communications ports for communicating with external devices, and various input and output (I/O) devices, such as a keyboard, a mouse, and a video display. Information handling system 400 can also include one or more buses operable to transmit information between the various hardware components.

Information handling system 400 can include devices or modules that embody one or more of the devices or modules described below and operates to perform one or more of the methods described below. Information handling system 400 includes a processors 402 and 404, an input/output (I/O) interface 410, memories 420 and 425, a graphics interface 430, a basic input and output system/universal extensible firmware interface (BIOS/UEFI) module 440, a disk controller 450, a hard disk drive (HDD) 454, an optical disk drive (ODD) 456, a disk emulator 460 connected to an external solid state drive (SSD) 462, an I/O bridge 470, one or more add-on resources 474, a trusted platform module (TPM) 476, a network interface 480, a management device 490, and a power supply 495. Processors 402 and 404, I/O interface 410, memory 420, graphics interface 430, BIOS/UEFI module 440, disk controller 450, HDD 454, ODD 456, disk emulator 460, SSD 462, I/O bridge 470, add-on resources 474, TPM 476, and network interface 480 operate together to provide a host environment of information handling system 400 that operates to provide the data processing functionality of the information handling system. The host environment operates to execute machine-executable code, including platform BIOS/UEFI code, device firmware, operating system code, applications, programs, and the like, to perform the data processing tasks associated with information handling system 400.

In the host environment, processor 402 is connected to I/O interface 410 via processor interface 406, and processor 404 is connected to the I/O interface via processor interface 408. Memory 420 is connected to processor 402 via a memory interface 422. Memory 425 is connected to processor 404 via a memory interface 427. Graphics interface 430 is connected to I/O interface 410 via a graphics interface 432 and provides a video display output 436 to a video display 434. In a particular embodiment, information handling system 400 includes separate memories that are dedicated to each of processors 402 and 404 via separate memory interfaces. An example of memories 420 and 430 include random access memory (RAM) such as static RAM (SRAM), dynamic RAM (DRAM), non-volatile RAM (NV-RAM), or the like, read only memory (ROM), another type of memory, or a combination thereof.

BIOS/UEFI module 440, disk controller 450, and I/O bridge 470 are connected to I/O interface 410 via an I/O channel 412. An example of I/O channel 412 includes a Peripheral Component Interconnect (PCI) interface, a PCI-Extended (PCI-X) interface, a high-speed PCI-Express (PCIe) interface, another industry standard or proprietary communication interface, or a combination thereof. I/O interface 410 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. BIOS/UEFI module 440 includes BIOS/UEFI code operable to detect resources within information handling system 400, to provide drivers for the resources, initialize the resources, and access the resources. BIOS/UEFI module 440 includes code that operates to detect resources within information handling system 400, to provide drivers for the resources, to initialize the resources, and to access the resources.

Disk controller 450 includes a disk interface 452 that connects the disk controller to HDD 454, to ODD 456, and to disk emulator 460. An example of disk interface 452 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 460 permits SSD 464 to be connected to information handling system 400 via an external interface 462. An example of external interface 462 includes a USB interface, an IEEE 4394 (Firewire) interface, a proprietary interface, or a combination thereof. Alternatively, solid-state drive 464 can be disposed within information handling system 400.

I/O bridge 470 includes a peripheral interface 472 that connects the I/O bridge to add-on resource 474, to TPM 476, and to network interface 480. Peripheral interface 472 can be the same type of interface as I/O channel 412 or can be a different type of interface. As such, I/O bridge 470 extends the capacity of I/O channel 412 when peripheral interface 472 and the I/O channel are of the same type, and the I/O bridge translates information from a format suitable to the I/O channel to a format suitable to the peripheral channel 472 when they are of a different type. Add-on resource 474 can include a data storage system, an additional graphics interface, a network interface card (NIC), a sound/video processing card, another add-on resource, or a combination thereof. Add-on resource 474 can be on a main circuit board, on separate circuit board or add-in card disposed within information handling system 400, a device that is external to the information handling system, or a combination thereof.

Network interface 480 represents a NIC disposed within information handling system 400, on a main circuit board of the information handling system, integrated onto another component such as I/O interface 410, in another suitable location, or a combination thereof. Network interface device 480 includes network channels 482 and 484 that provide interfaces to devices that are external to information handling system 400. In a particular embodiment, network channels 482 and 484 are of a different type than peripheral channel 472 and network interface 480 translates information from a format suitable to the peripheral channel to a format suitable to external devices. An example of network channels 482 and 484 includes InfiniBand channels, Fibre Channel channels, Gigabit Ethernet channels, proprietary channel architectures, or a combination thereof. Network channels 482 and 484 can be connected to external network resources (not illustrated). The network resource can include another information handling system, a data storage system, another network, a grid management system, another suitable resource, or a combination thereof.

Management device 490 represents one or more processing devices, such as a dedicated baseboard management controller (BMC) System-on-a-Chip (SoC) device, one or more associated memory devices, one or more network interface devices, a complex programmable logic device (CPLD), and the like, which operate together to provide the management environment for information handling system 400. In particular, management device 490 is connected to various components of the host environment via various internal communication interfaces, such as a Low Pin Count (LPC) interface, an Inter-Integrated-Circuit (I2C) interface, a PCIe interface, or the like, to provide an out-of-band (OOB) mechanism to retrieve information related to the operation of the host environment, to provide BIOS/UEFI or system firmware updates, to manage non-processing components of information handling system 400, such as system cooling fans and power supplies. Management device 490 can include a network connection to an external management system, and the management device can communicate with the management system to report status information for information handling system 400, to receive BIOS/UEFI or system firmware updates, or to perform other task for managing and controlling the operation of information handling system 400.

Management device 490 can operate off of a separate power plane from the components of the host environment so that the management device receives power to manage information handling system 400 when the information handling system is otherwise shut down. An example of management device 490 include a commercially available BMC product or other device that operates in accordance with an Intelligent Platform Management Initiative (IPMI) specification, a Web Services Management (WSMan) interface, a Redfish Application Programming Interface (API), another Distributed Management Task Force (DMTF), or other management standard, and can include an Integrated Dell Remote Access Controller (iDRAC), an Embedded Controller (EC), or the like. Management device 490 may further include associated memory devices, logic devices, security devices, or the like, as needed, or desired.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. An information handling system comprising:
    a plurality of keyboard backlights;
    an embedded controller (EC) to communicate with the keyboard backlights, the EC to:
        in response to an activate keyboard backlights signal, turn on the keyboard backlights; and
        in response to a deactivate keyboard backlights signal, turn off the keyboard backlights; and
    a processor to communicate with the EC, the processor to:
        receive a sensitivity level setting for detection of an ultrasonic waveform, wherein the sensitivity level setting controls a location of an object with respect to a keyboard to trigger that the ultrasonic waveform is no longer received;
        determine whether the ultrasonic waveform is received;
        in response to the ultrasonic waveform not being received, provide the activate keyboard backlights signal to the EC; and
        in response to the ultrasonic waveform being received, provide the deactivate keyboard backlights signal to the EC.

2. The information handling system of claim 1, wherein the determination of whether the ultrasonic waveform is received, the processor further to:
    determine whether a power level of the ultrasonic waveform is above a threshold level;
    in response to the power level being above the threshold level, determine that the ultrasonic waveform is being received; and
    in response to the power level not being above the threshold level, determine that the ultrasonic waveform is not being received.

3. The information handling system of claim 1, further comprising: a digital signal processor to communicate with the processor, the digital signal processor to generate the ultrasonic waveform.

4. The information handling system of claim 1, further comprising: a speaker to provide the ultrasonic waveform outside of the information handling system.

5. The information handling system of claim 4, wherein prior to the ultrasonic waveform being provided by the speaker, the processor further to: determine that a human presence has been detected.

6. The information handling system of claim 4, further comprising a microphone to receive the ultrasonic waveform provided by the speaker.

7. The information handling system of claim 1, wherein in response to the ultrasonic waveform being received and prior to the deactivate keyboard backlights signal being provided to the EC, the processor further to:
set a timer; and
in response to an expiration of the timer, provide the deactivate keyboard backlights signal to the EC.

8. The information handling system of claim 7, wherein the timer is set to a continuous amount of time that ultrasonic waveform is to be received before the keyboard backlights are to be turned off.

9. A method comprising:
receiving, by a processor of an information handling system, a sensitivity level setting for detection of an ultrasonic waveform, wherein the sensitivity level setting controls a location of an object with respect to a keyboard to trigger that the ultrasonic waveform is no longer received;
determining, by the processor, whether the ultrasonic waveform is received;
in response to the ultrasonic waveform not being received, providing, by the processor, an activate keyboard backlights signal;
in response to the ultrasonic waveform being received, providing a deactivate keyboard backlights signal;
in response to the activate keyboard backlights signal, turning on, by an embedded controller of the information handling system, keyboard backlights of the information handling system; and
in response to the deactivate keyboard backlights signal, turning off, by the embedded controller, the keyboard backlights.

10. The method of claim 9, wherein the determining of whether the ultrasonic waveform is received, the method further comprising:
determining whether a power level of the ultrasonic waveform is above a threshold level;
in response to the power level being above the threshold level, determining that the ultrasonic waveform is being received; and
in response to the power level not being above the threshold level, determining that the ultrasonic waveform is not being received.

11. The method of claim 9, further comprising: generating, by a digital signal processor, the ultrasonic waveform.

12. The method of claim 9, further comprising: providing, by a speaker, the ultrasonic waveform outside of the information handling system.

13. The method of claim 12, wherein prior to the ultrasonic waveform being provided by the speaker, the method further comprising: determining that a human presence has been detected.

14. The method of claim 12, further comprising: receiving, by a microphone, the ultrasonic waveform provided by the speaker.

15. The method of claim 9, wherein in response to the ultrasonic waveform being received and prior to the providing of the deactivate keyboard backlights signal, the method further comprising:
setting a timer; and
in response to an expiration of the timer, providing the deactivate keyboard backlights signal.

16. The method of claim 15, wherein the timer is set to a continuous amount of time that ultrasonic waveform is to be received before the keyboard backlights are to be turned off.

17. An information handling system comprising:
a keyboard including a plurality of keys;
a plurality of keyboard backlights to illuminate the keys of the keyboard;
an embedded controller (EC) to communicate with the keyboard backlights, the EC to:
in response to an activate keyboard backlights signal, turn on the keyboard backlights; and
in response to a deactivate keyboard backlights signal, turn off the keyboard backlights; and
a processor to:
receive a sensitivity level setting for detection of an ultrasonic waveform, wherein the sensitivity level setting controls a location of an object with respect to a keyboard to trigger that the ultrasonic waveform is no longer received;
determine whether the ultrasonic waveform is received;
in response to the ultrasonic waveform not being received, provide the activate keyboard backlights signal to the EC; and
in response to the ultrasonic waveform being received, provide the deactivate keyboard backlights signal to the EC.

18. The information handling system of claim 17, wherein the determination of whether the ultrasonic waveform is received, the processor further to:
determine whether a power level of the ultrasonic waveform is above a threshold level;
in response to the power level being above the threshold level, determine that the ultrasonic waveform is being received; and
in response to the power level not being above the threshold level, determine that the ultrasonic waveform is not being received.

19. The information handling system of claim 17, further comprising: a speaker to provide the ultrasonic waveform outside of the information handling system.

20. The information handling system of claim 19, wherein prior to the ultrasonic waveform being provided by the speaker, the processor further to: determine that a human presence has been detected.

* * * * *